March 20, 1928.

J. W. DWIGGINS 1,662,962

WIRE FENCE MACHINE

Filed Sept. 2, 1926

INVENTOR.
John W. Dwiggins
BY
ATTORNEY.

March 20, 1928.

J. W. DWIGGINS 1,662,962

WIRE FENCE MACHINE

Filed Sept. 2, 1926

INVENTOR.
John W. Dwiggins
BY
ATTORNEY.

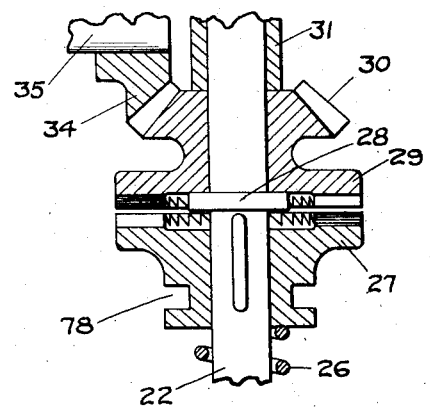
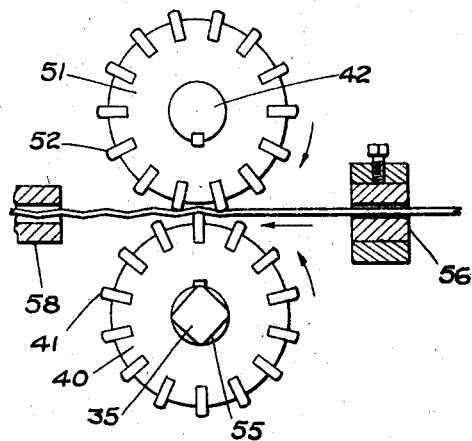
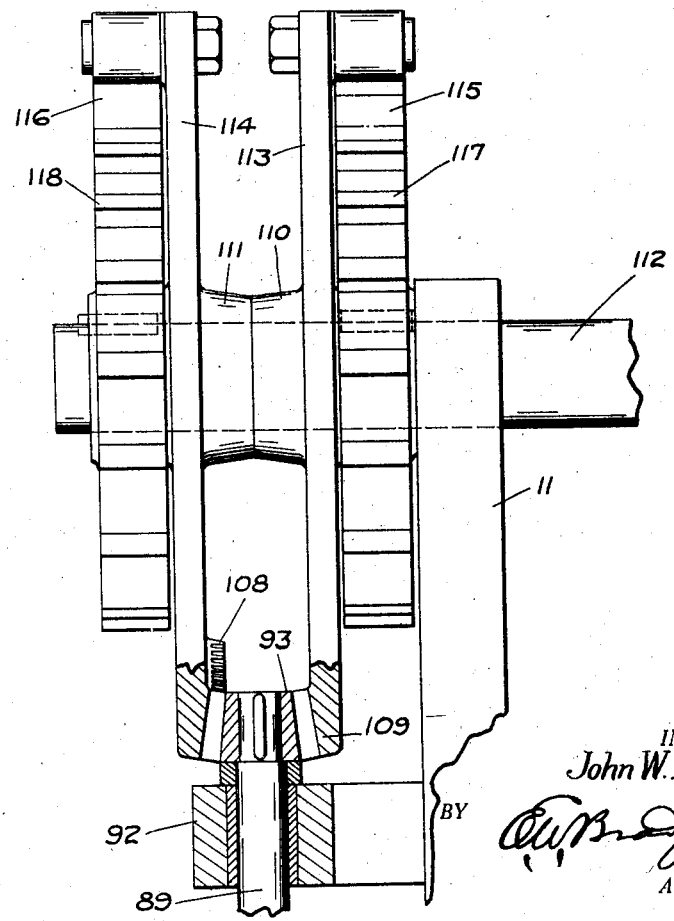

March 20, 1928.
J. W. DWIGGINS
WIRE FENCE MACHINE
Filed Sept. 2. 1926
1,662,962
9 Sheets-Sheet 4
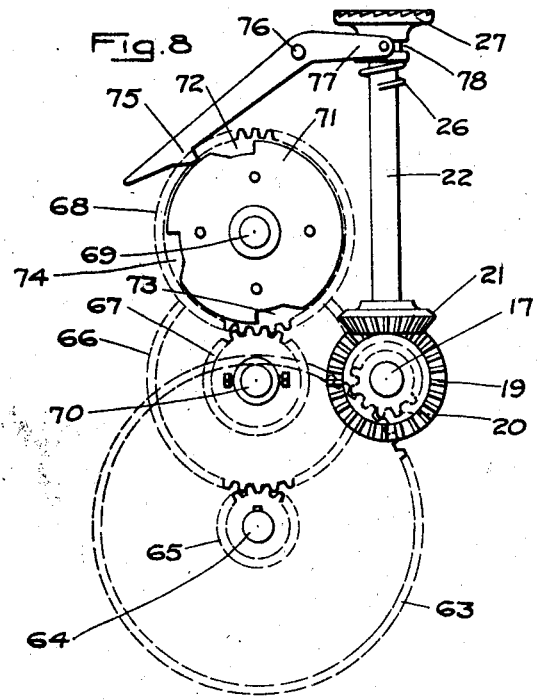
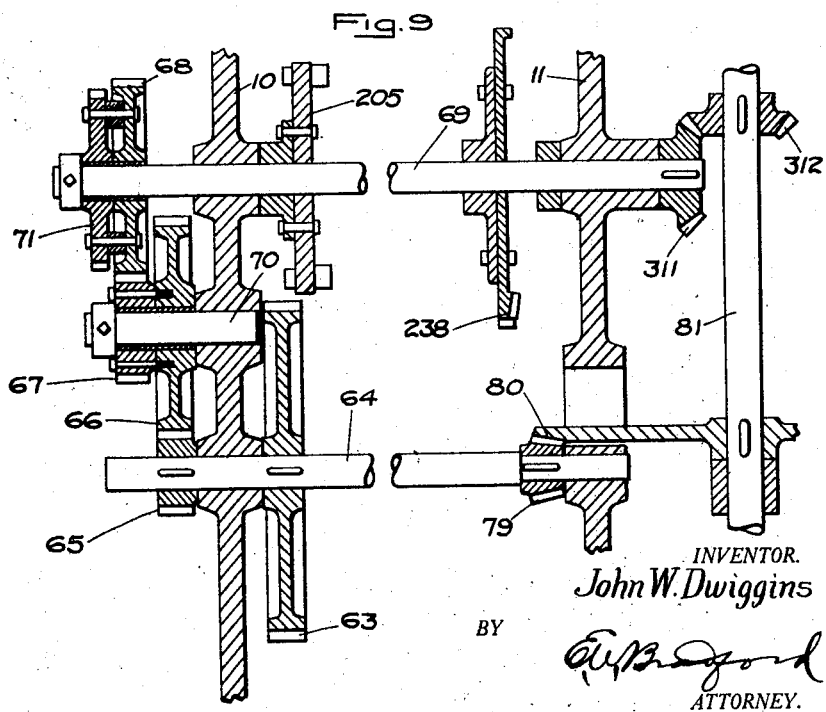
INVENTOR.
John W. Dwiggins
BY
ATTORNEY.

March 20, 1928.  1,662,962
J. W. DWIGGINS
WIRE FENCE MACHINE
Filed Sept. 2, 1926.  9 Sheets-Sheet 5

INVENTOR.
John W. Dwiggins
BY
ATTORNEY.

March 20, 1928. 1,662,962
J. W. DWIGGINS
WIRE FENCE MACHINE
Filed Sept. 2, 1926 9 Sheets-Sheet 6
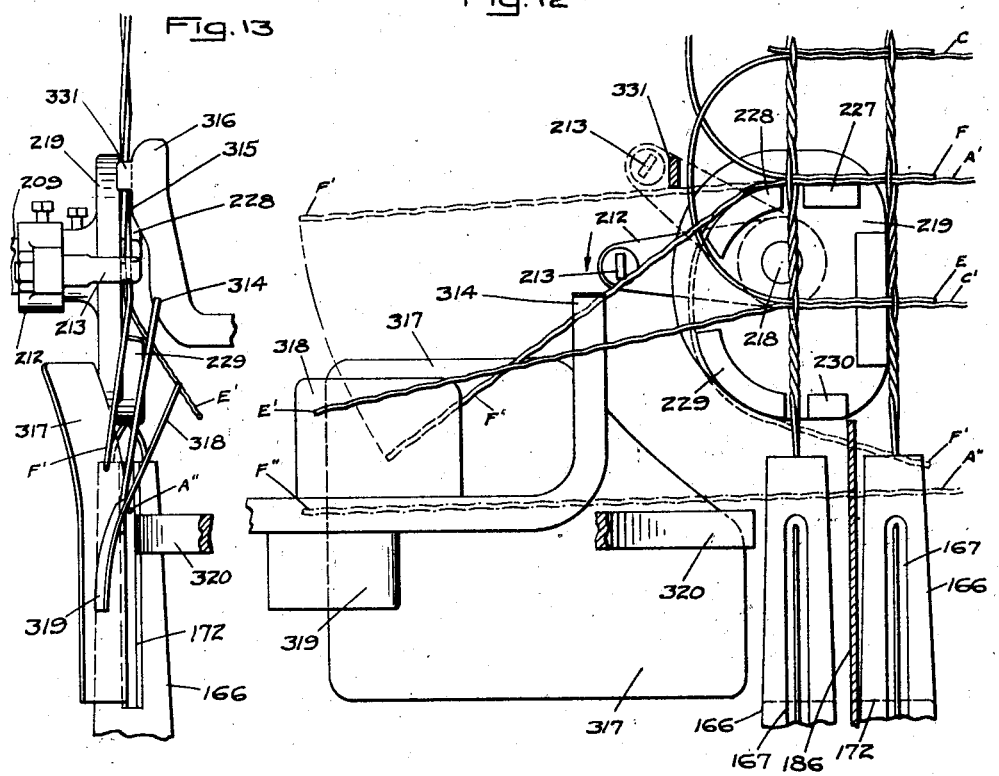
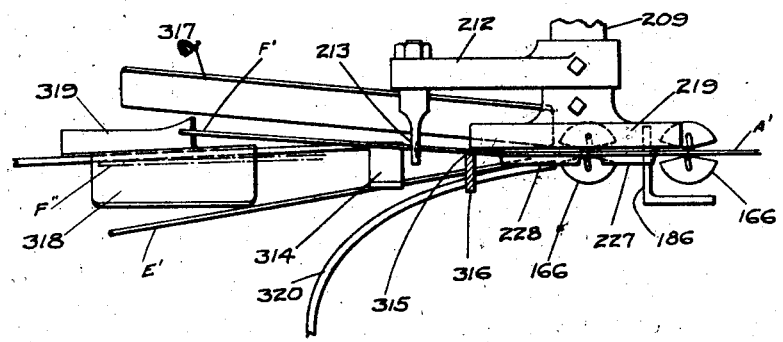
INVENTOR.
John W. Dwiggins
BY
ATTORNEY.

March 20, 1928.
J. W. DWIGGINS
1,662,962
WIRE FENCE MACHINE
Filed Sept. 2, 1926
9 Sheets-Sheet 7
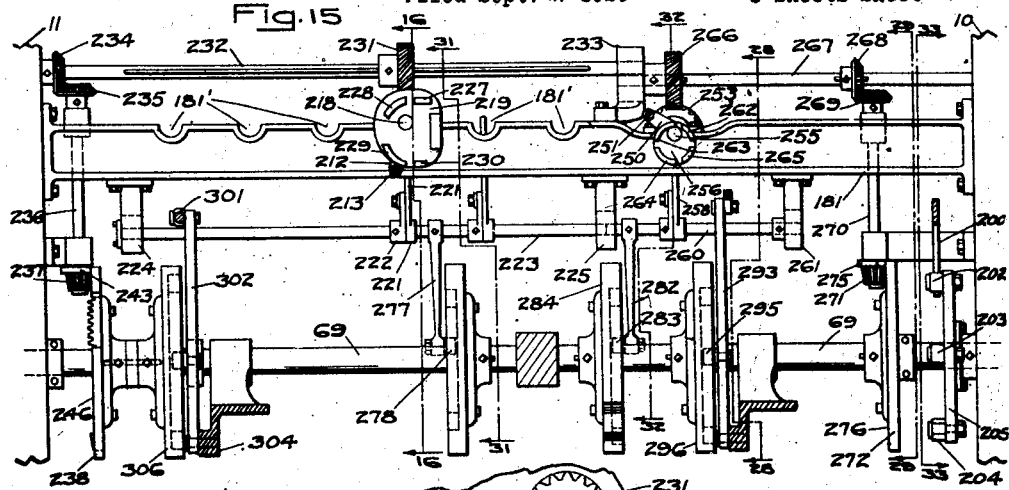
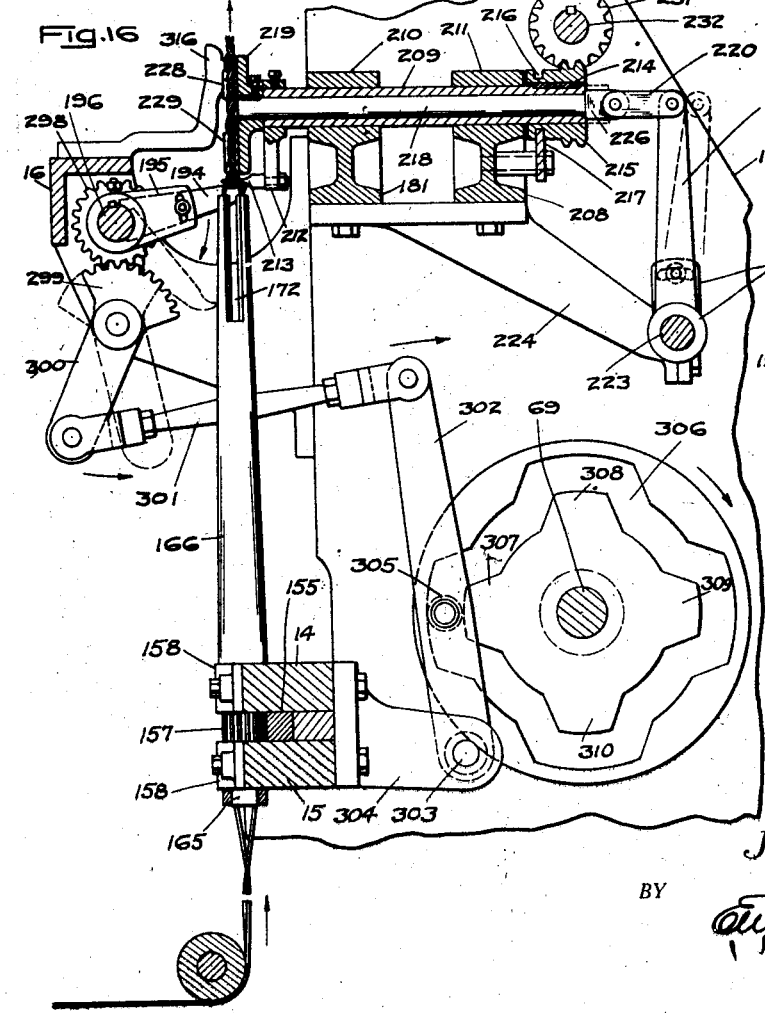
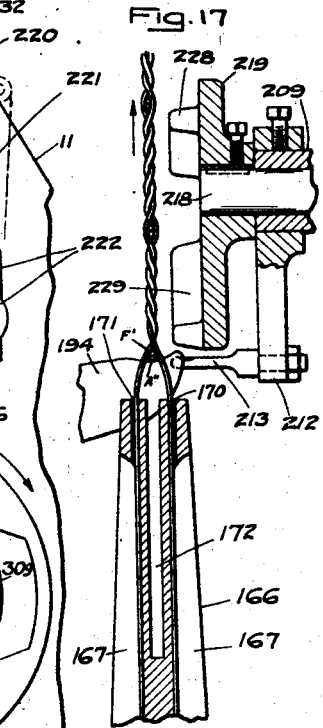
INVENTOR.
John W. Dwiggins
BY
ATTORNEY.

March 20, 1928.
J. W. DWIGGINS
1,662,962
WIRE FENCE MACHINE
Filed Sept. 2, 1926
9 Sheets-Sheet 8
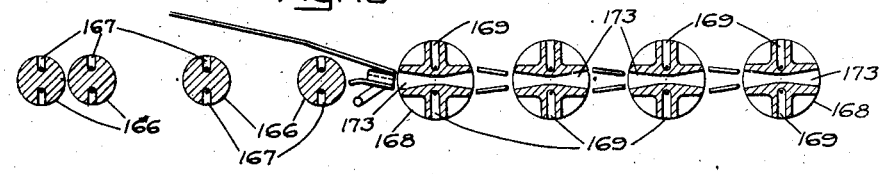
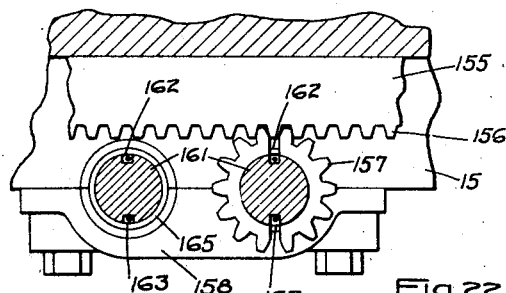
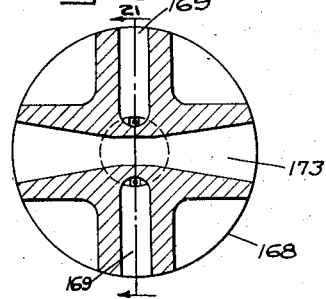
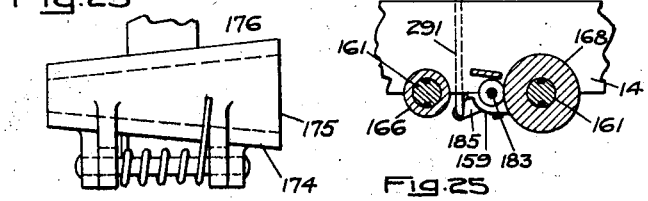
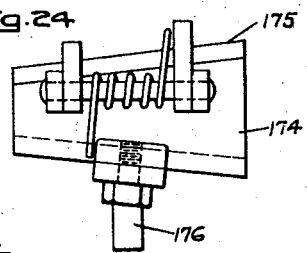
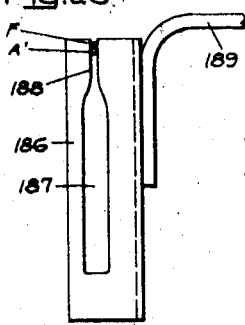
INVENTOR.
John W. Dwiggins
BY
ATTORNEY.

March 20, 1928.
J. W. DWIGGINS
1,662,962
WIRE FENCE MACHINE
Filed Sept. 2, 1926
9 Sheets-Sheet 9
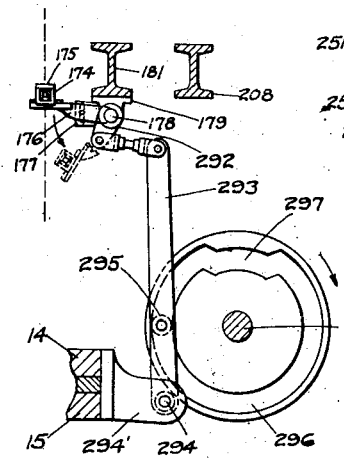
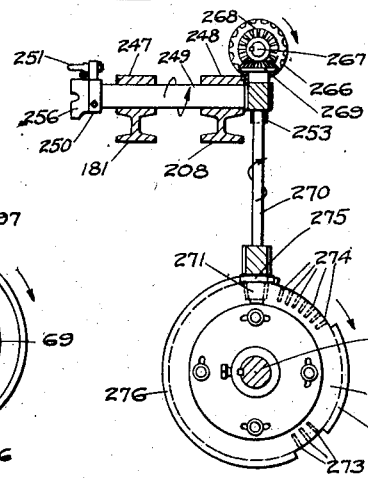
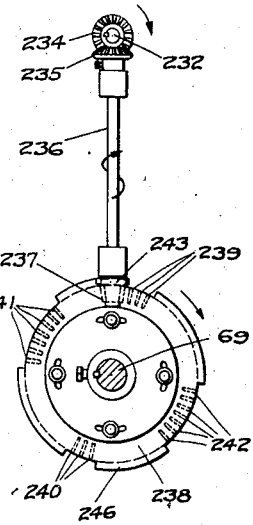
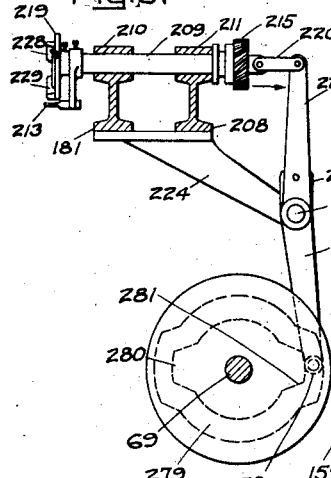
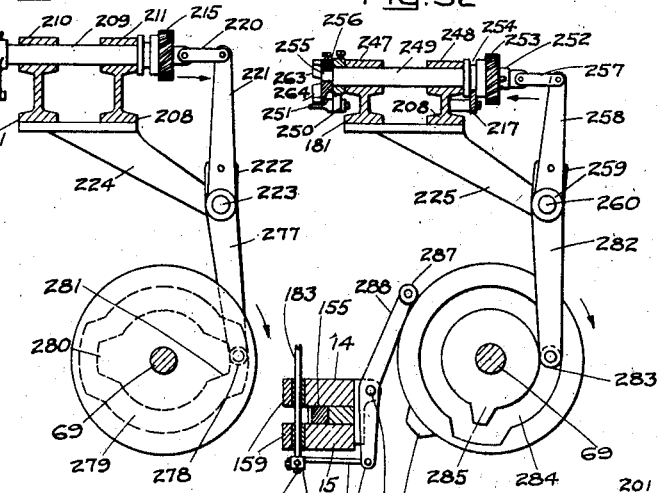
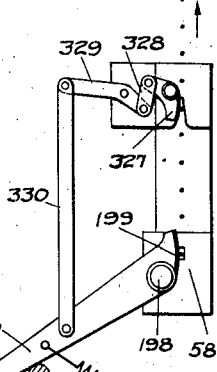
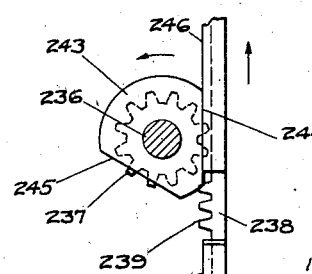
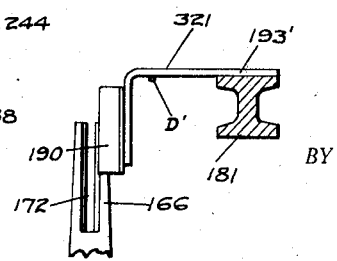
INVENTOR.
John W. Dwiggins
BY
ATTORNEY.

Patented Mar. 20, 1928.

1,662,962

UNITED STATES PATENT OFFICE.

JOHN W. DWIGGINS, OF KNIGHTSTOWN, INDIANA, ASSIGNOR TO THE PARRISH-ALFORD FENCE AND MACHINE COMPANY, OF KNIGHTSTOWN, INDIANA, A CORPORATION OF INDIANA.

WIRE-FENCE MACHINE.

Application filed September 2, 1926. Serial No. 133,253.

This invention relates to a machine for fabricating wire fence of a more or less decorative type.

The object of this invention is to produce a machine or loom whereby the material is handled entirely by automatic means from the time it enters as raw material until it leaves as a finished product.

The particular type of fence made by this machine has a series of longitudinal warp strands, each made by twisting two wires about each other and at intervals having a series of vertical pickets caught or woven in the twist. These pickets form the weft and are looped over at their upper ends to form an attractive pattern consisting of a series of overlapping arches.

Another series of vertical pickets is woven into the fence as weft, these being of less height and also being looped at their upper ends but with both free ends extending to the bottom of the fence, differing in this respect from the longer pickets, one free end of each long picket extending downwards only through two of the longitudinal twisted strands at the top of the fence. The ends of the short pickets alternate each with one of the long free ends of the long pickets. That is, one piece of picket wire forms one full-length weft plus one arch at one edge of the fabric. These arches or loops form a neat selvage which later becomes the top of the fence. The next piece of picket wire forms two half wefts at one side of the fabric, which side becomes the lower part of the fence, plus an arch connecting the two half wefts. This last-named arch is in the middle of the fabric.

With the above-mentioned object in view, my invention consists of the novel arrangement and construction of parts as hereinafter described and claimed, reference being had to the accompanying drawings, forming part of this specification, in which corresponding parts in the several figures are designated by like characters of reference and in which:

Figure 4:
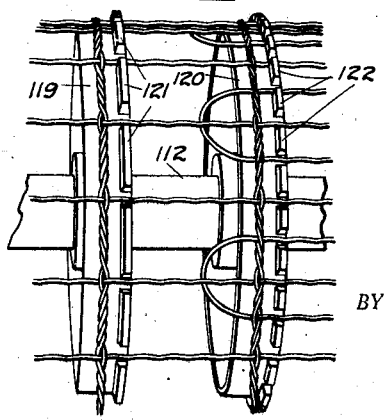
Figure 10:
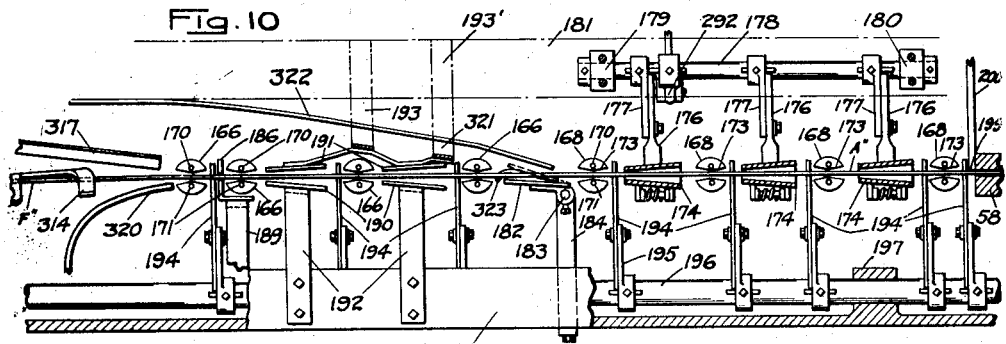
Figure 11:
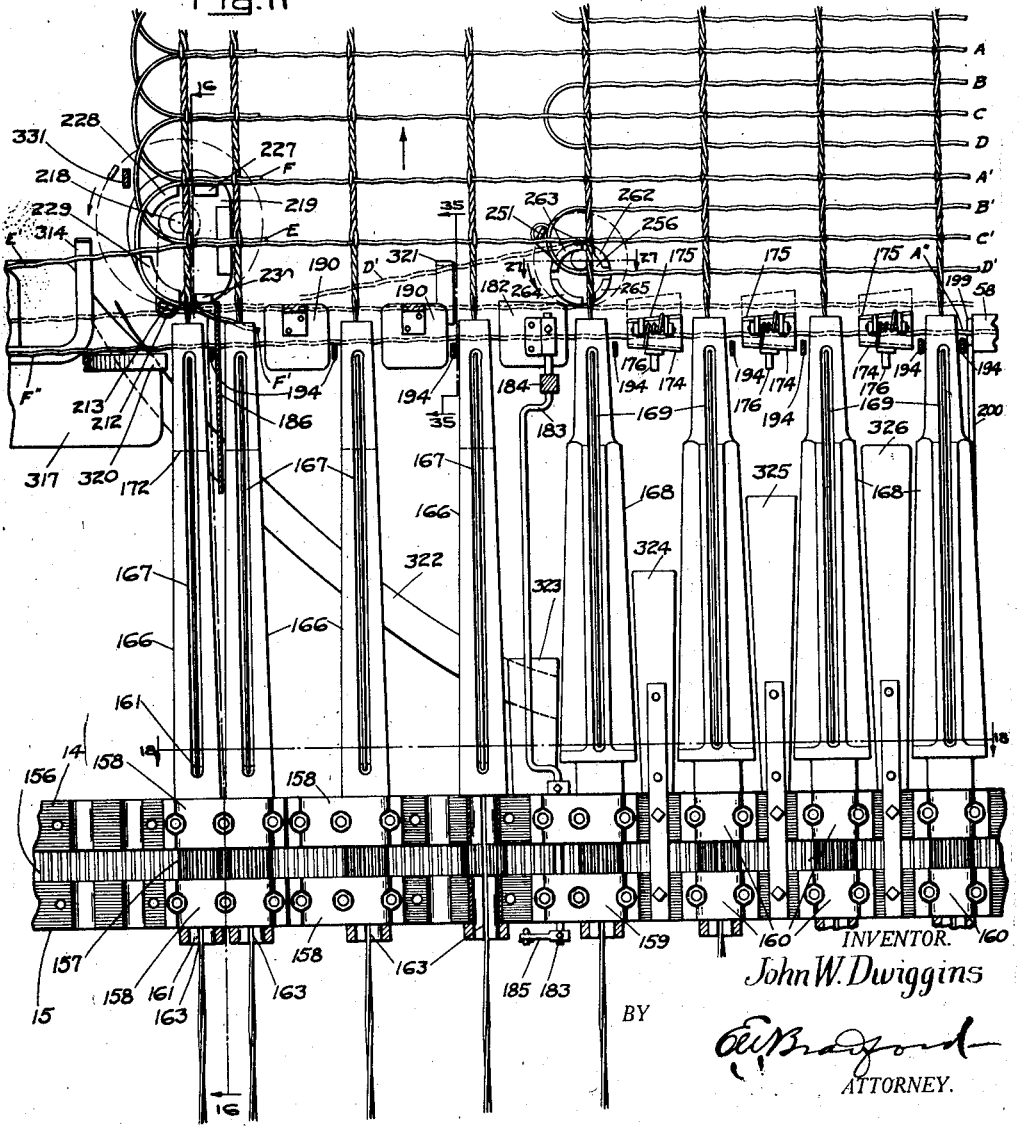

Fig. 4, a detail of the fence pulling sprockets;

Fig. 5, a section through the picket feed roll clutch;

Fig. 6, a detail of the picket feeding rolls;

Fig. 7, a detail of the ratchets for advancing the pulling sprockets;

Figs. 8 and 9 are diagrams of the shafting and gearing for driving the various units of the machine;

Fig. 10 is a plan view showing the upper ends of the twisting spindles, the picket guides, and the picket fingers;

Fig. 11, an elevation of the twisting spindles, picket guides, forming or looping heads, and a portion of completed fence;

Fig. 12, a detail of the selecting guides for the upper ends of the long pickets;

Fig. 13, an end view of the selecting guides shown in Fig. 12;

Fig. 14, a plan view of the selecting guides;

Fig. 15, a view of the cam and gear mechanism taken behind the twisting spindles and looking in the same direction as in Fig. 11;

Fig. 16, a cross-section on the line 16—16 of Figs. 11 and 15;

Fig. 17, an enlarged detail of the large forming head;

Fig. 18, a section on line 18—18 of Fig. 11;

Fig. 19, a detail section of the twisting spindle gears;

Fig. 20, an enlarged section of a twisting spindle;

Fig. 21, an enlarged sectional detail taken on line 21—21 of Fig. 20 of a twisting spindle gear;

Fig. 22, a detail of the switch for deflecting the short picket;

Fig. 23, an enlarged plan view of a picket guide box;

Fig. 24, an elevation of a picket guide box;

Fig. 25, an end view of a picket guide box;

Fig. 26, a detail of the guide for the looped end of the long pickets;

Fig. 27, a detail section on line 27—27 of Fig. 11;

Fig. 28 shows the picket guide box operating cam and linkage;

Fig. 29, the gearing for rotating the bending finger for forming the loop in the short picket;

Fig. 30, the gearing for rotating the bending finger for forming the loop in the long picket;

Fig. 31, the cam and linkage for operating the large forming head;

Fig. 32, the cam and linkage for operating the small forming head;

Fig. 33, the picket cut-off knives;

Fig. 34 is a detail of the gearing shown in Fig. 30,

Fig. 35, a detail on line 35—35 of Fig. 11; and

Figure 1:
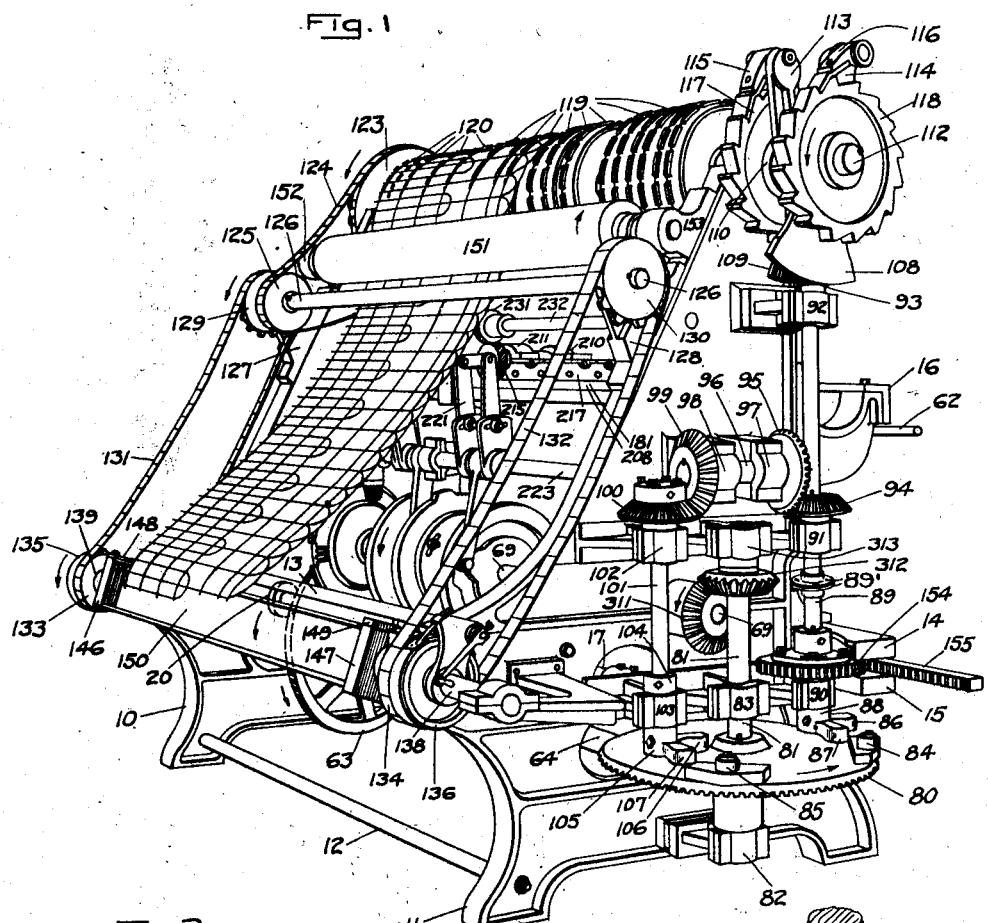
Fig. 1 represents a perspective view of the machine.
Figure 36:
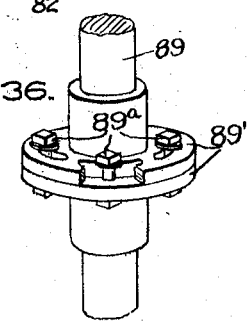

Fig. 36, a detail perspective view of a portion of shaft 89 in Fig. 1, showing more clearly the means for securing its two parts together for obtaining axial adjustment between the upper and lower sections, which means consists of abutting flanges 89′ rigid on the respective sections and clamping bolts 89ª mounted in segmental slots in said flange.

Figure 3:
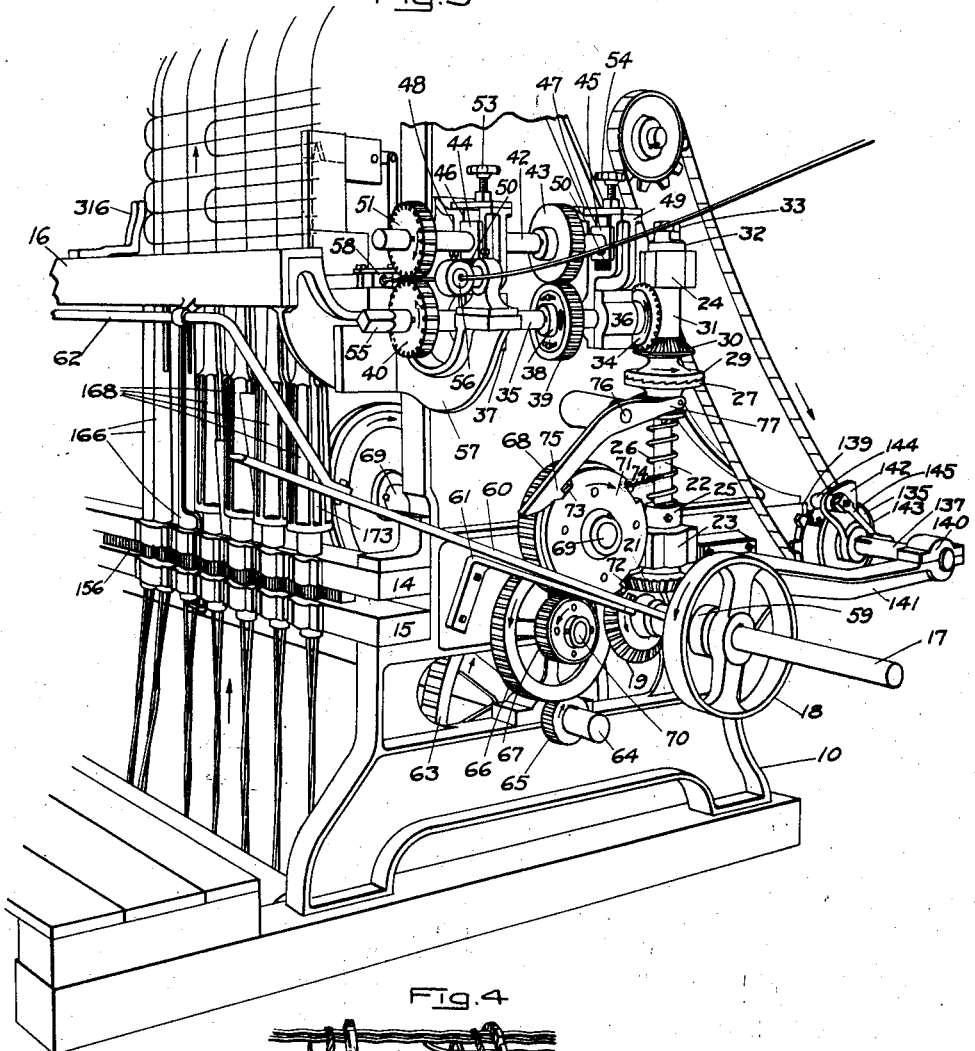
Fig. 3 is a perspective of the machine viewed from the opposite side from Fig. 1, with some portions omitted.

Referring to the drawings, Figs. 1 and 3, the framework of the machine is made up of two end housings 10 and 11 tied together by rods 12 and 13, bars 14 and 15, angle bar 16, and beams 181 and 208. A drive shaft 17 is mounted in housings 10 and 11.

Shedding.

Shaft 64 has secured to it just within housing 11 a bevel pinion 79 (Fig. 9) which drives a bevel gear 80 (Fig. 1) secured to a vertical shaft 81, journaled in bearings 82 and 83 on housing 11. On top of gear 80 are mounted two rollers 84 and 85 (Fig. 1) having vertical axes. Rollers 84 and 85 engage successively arms 86 and 87 which are part of a hub 88, secured to a vertical shaft 89 mounted in bearings 90, 91 and 92 on housing 11, thereby rotating a pinion 93, secured to the upper end of shaft 89, in a counter-clockwise direction looking down; each roller turning shaft 89 one quarter turn. Also secured to shaft 89 immediately above bearing 91 is a miter gear 94 meshing with a miter gear 95 secured to one end of a horizontal shaft 96 journaled in bearings 97 and 98 on housing 11. On the other end of the shaft 96 is secured a miter gear 99 meshing with a miter gear 100, which is adjustably mounted on vertical shaft 101, journaled in bearings 102 and 103 on housing 11. A thrust collar 104 supports shaft 101 on bearing 103. On the lower end of shaft 101 is secured hub 105 having arms 106 and 107 which are also successively engaged by rollers 84 and 85; when this occurs bevel pinion 93 will be caused to rotate in a clock-wise direction. The arms 106—107 may be properly timed with arms 86 and 97 by means of the adjustment of gear 100 so that they come alternately in the path of rollers 84 and 85.

Figure 2:
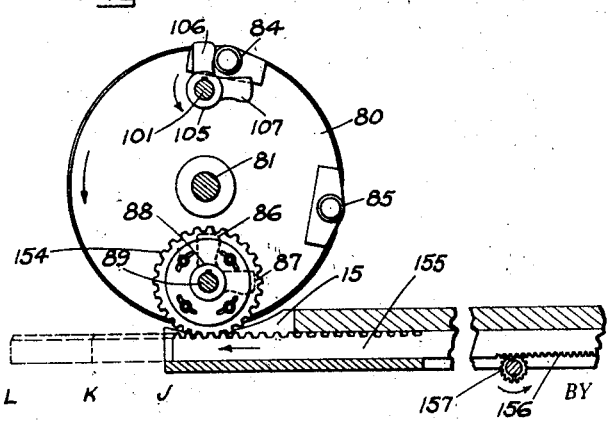
Fig. 2 shows in detail a part of the mechanism for operating the twisting spindles.

Mounted on shaft 89 (Fig. 1) immediately above bearing 90 is a gear 154, which is adjustable, see Fig. 2, and meshes with a rack 155. Rack 155 is mounted between bars 14 and 15 (Fig. 1) and has another series of rack teeth 156, (Figs. 2 and 3) cut in it, which teeth extend practically from one end of the machine to the other and engage pinions 157 (Figs. 11, 19 and 21) which are journaled in bearings 158, 159 and 160 (Fig. 11).

The motion (Fig. 2) imparted to arms 86 and 87 on shaft 89 and that imparted to arms 106 and 107 on shaft 101 by rollers 84 and 85 causes gear 154 to rotate first in one direction a quarter turn, twice in succession, and twice in succession in the other direction first causing rack 155 to move from position J to K then from K to L and back from L to K and K to J thereby rotating pinions 157 one and one half turns each time.

Pinions 157 are integral with shafts 161 which extend both upward and downward from pinions 157. Two slots 162 and 163 (Fig. 19) are cut between the teeth of pinions 157 opposite each other and extend below the surface of shaft 161, forming grooves through which the wires for the twisted strands are run. To prevent the grooves from cutting the bearing surface of bearings 158, 159 and 160 sleeves 164 and 165 (Fig. 21) are pressed over each shaft providing a continuous bearing surface, and also preventing the wire from coming in contact with the bearing surface.

Secured to the upper ends of shafts 161 is one series of twisting spindles 166, (left half of Figure 11) having grooves 167 cut in their sides and registering with grooves 162 and 163 in shafts 161, and another series of twisting spindles 168 (right half of Figure 11) having grooves 169 formed in their sides which register with grooves 162 and 163 in their respective shafts 161. Spindles 166 and 168 have holes 170 and 171 (Fig. 10) bored in their upper ends, which register with grooves 167 and 169, and through which the wires run for the forming of the twisted warp strands. Twisting spindles 166 are bifurcated at their upper ends at 172 as may be clearly seen in Figures 16 and 17 and spindles 168 are bifurcated for practically their entire length at 173 as may be seen by referring to Figures 3, 20 and 21.

Take-up.

Bevel pinion 93 is mounted between two segmental bevel gears 108 and 109 depending from hubs 110 and 111 (Fig. 7) which are freely mounted on a shaft 112, journaled at the top of housings 10 and 11. Extending upward from hubs 110 and 111 are arms 113 and 114, to which are pivoted latch pawls 115 and 116, adapted to engage alternately ratchets 117 and 118, secured to shaft 112 (Fig. 1).

Mounted on shaft 112 between housings 10 and 11 is the take-up consisting of two series of sprockets 119 and 120 engaging the fence, and drawing it intermittently through the weaving mechanism. As illustrated in Figure 4, sprockets 119 have long teeth 121 adapted to engage the upper part of the fence; sprockets 120 have short teeth 122, adapted to engage the lower part of the fence.

On the end of the shaft 112 opposite from ratchets 117 and 118 is secured a chain sprocket 123 over which is run chain 124 and driving through sprocket 125 a shaft 126 (Fig. 1) journaled in brackets 127 and 128 on housings 10 and 11. Secured to the ends of shaft 126 are sprockets 129 and 130, which in turn, drive through chains 131 and 132 and sprockets 133 and 134, clutch drums 135 and 136 (Fig. 1) which are loosely mounted on shafts 137 and 138. Shaft 137 (Fig. 3) is journaled at its inner end in a bearing 139 on housing 10, and at its outer end in bearing 140, formed in a bracket 141, attached to housing 10, and has secured to it a clutch member consisting of an arm 142, to which is adjustably attached one end of a friction band 143, the other end of which is attached to an eccentric member 144, controlled by a handle 145, serving to tighten band 143 about drum 135. Shaft 138 (Fig. 1) is driven likewise by drum 136, and is mounted in a manner similar to shaft 137.

In the inner ends of shafts 137 and 138 are secured socket members 146 and 147 (Fig. 1) provided with removable sides 148 and 149 into which may be placed the ends of a channel beam or core member 150 upon which is wound the finished fence. The fence is kept under a slight tension by the clutches, as they are driven at a higher rate of speed than that of shaft 112, it being understood that the clutches allow for the increasing diameter of the finished roll of fence.

A roll 151 (Fig. 1) is carried in bearings 152 and 153 on the upper part of housings 10 and 11 in such position as to cause the fence to lie practically half way around the pulling or take-up sprockets 119 and 120, thereby distributing the pulling effect of sprocket teeth 121 and 122 over a considerable portion of the fence.

Weft insertion.

Secured to shaft 17 (Fig. 3) is a belt driven pulley 18, a bevel gear 19 and a spur pinion 20 (Fig. 8). Meshing with level gear 19 is a smaller bevel gear 21 secured to the lower end of a vertical shaft 22 mounted in bearings 23 and 24 (Fig. 3) on housing 10. Shaft 22 is provided with a collar 25 secured thereto. Around shaft 22 resting on collar 24 is a coil spring 26 which bears against a sliding clutch member 27 splined to shaft 22. Above clutch member 27 and integral with shaft 22 is a collar 28 (Fig. 5) supporting a loosely mounted clutch member 29 which is a unit with a miter gear 30. Between gear 30 and bearing 24 is a spacer 31 and threaded on the upper end of shaft 22 is a thrust on bearing 24. Gear 30 meshes with a gear 34 mounted and secured to a horizontal shaft 35. Shaft 35 is journaled in bearings 36 and 37 on housing 10. Splined to shaft 35 between bearings 36 and 37 is a hub 38 to which is secured a spur gear 39 in such a manner that an angular adjustment may be obtained between the hub 38 and gear 39. On the end of the shaft 35 beyond bearing 37 is secured a feed roll 40 for the weft having hard metal teeth 41 (Fig. 6) inserted in its periphery. Secured to a shaft 42 and meshing with gear 39 is a spur gear 43 (Fig. 3). Shaft 42 is carried in journal blocks 44 and 45 mounted in vertical slots 46 and 47 in brackets 48 and 49. Between blocks 44 and 45, and the bottom of slots 46 and 47, are rubber cushions 50 serving as flexible supports. Secured to the end of shaft 42 is a feed roll 51 having in its periphery teeth 52. Teeth 52 intermesh with teeth 41 on roll 40, and it is to obtain the even spacing between the teeth on the two rolls that adjustment is provided between hub 38 and gear 39. Feed rolls 40 and 51 are for feeding in the wire that forms the pickets or weft in the fence or fabric and in the act of doing this the wire is crimped alternately by the teeth 41 and 52, (Fig. 6) the amount of the crimp being controlled by adjusting screws 53 and 54 (Fig. 3) which bear down on blocks 44 and 45. The crimp would be increased by turning down screw 53 and loosening screw 54, and as gears 39 and 43 are midway between the bearings their meshing is substantially retained.

For the purpose of starting the picket wire or weft into the machine, shaft 35 has its end squared at 55 (Fig. 3), so it may be turned by means of a wrench or crank. The picket wire is guided between rolls 40 and 51 by means of an eyelet 56, adjustably mounted on a bracket 57, on housing 10. After leaving rolls 40 and 51 the picket wire goes through a guide 58, from whence it enters the weaving mechanism, later described. A clutch 59 is provided between pulley 18 and shaft 17, controlled by lever 60 pivoted on bracket 61 on housing 10. A slide rod 62 is mounted in brackets on angle bar 16, and fastened at one end to lever 60. Rods 62 extends from one end of the machine to the other, and is readily accessible for starting and stopping the machine.

Pinion 20 (Fig. 8) on shaft 17 meshes with spur gear 63 (Fig. 9) secured to a shaft 64, journaled in housings 10 and 11. On shaft 64 is secured a spur pinion 65, which meshes with the larger one 66 of a pair of reducing gears. The smaller gear 67 meshes in turn with a gear 68, which is loosely mounted on a cam shaft 69.

Gears 66 and 67 are loosely mounted on a stub shaft 70 which is anchored in housing 10, and are fastened together by any suitable means.

Secured to gear 68 is a cam 71. Cam 71 is made with three notches in its periphery, 72, 73 and 74 (Fig. 3). Engaging the periphery of the cam is a follower 75, which is pivoted at 76 to housing 10 and is forked at 77, the ends of the fork engaging a groove 78 (Fig. 5) in the sliding clutch member 27 (Fig. 3). The length of notches 72, 73 and 74 control the length of the pickets or weft.

Between spindles 168 near their upper end are guide boxes 174 (Fig. 11), each provided with a hinged spring-closed cover 175 for the purpose of guiding the picket-wire through the bifurcations 173 (Fig. 10) in spindle 167, the covers 175 permitting the picket-wires to escape when the fence is pulled up. Details are shown in Figures 23, 24, 25 and 28.

Guide boxes 174 are mounted on adjustable members 176 (see right half of Fig. 10) attached to slotted arms 177, these arms being secured to a rocker shaft 178 which is journaled in bearings 179 and 180 attached to the bottom side of a beam 181. Beam 181 is bolted at one end to housing 10 and at the other end to housing 11.

The first two of spindles 166 (at the left of Fig. 10) are spaced close together and have between them a guide-plate 186, (Fig. 11) having in it a slot 187 (Fig. 26) which narrows down at its upper end 188, so that it will just accommodate a single picket or weft in width, but more than one above each other. Guide-plate 186 is attached by means of bracket 189 to angle-bar 16.

Between the remaining spindles 166 are stationary guides 190 and 191. Guides 190 (Fig. 11) are carried on brackets 192 (Fig. 10) which are bolted to angle-bar 16.

Interspersed with spindles 166 and 168 and guides 190 and 174, and guide-plate 186 are fingers 194 (Fig. 16), which are adjustably attached to levers 195, which are mounted on a rocker shaft 196 (seen in the lower part of Fig. 10) carried in bearings 197 in angle-bar 16.

Adjacent to picket wire guide 58 (Fig. 10) and pivoted thereto at 198 is a knife 199 (Fig. 33), the knife serving to cut off the picket after the proper length of wire has been fed in by the feed rolls. The knife 199 is part of a lever arm 200 which has a bent portion 201 at its extremity, which is engaged by rollers 202, 203, 204 and 204', mounted on a disc 205 secured to cam shaft 69 (Fig. 15). A spring 206 (Fig. 33) is provided to retract lever 200 which normally rests against the stop 207 secured to housing 10.

Referring to Figures 10 and 28: Rocker shaft 178 carrying guide boxes 174, is operated by a lever 292 which is linked to an arm 293, pivoted at 294 to a bracket 294' attached to bars 14 and 15 and carrying a roller 295, which is actuated by a face cam 296, secured to shaft 69 and having a depression 297.

Referring to Figures 15 and 16: Shaft 196, carrying fingers 194, has secured to it a gear 298, meshing with segmental gear 299, having extending from it a lever 300. Lever 300 is connected by means of a rod 301, to an arm 302 pivoted at 303 to a bracket 304, attached to bars 14 and 15, and carrying a roller 305, which is actuated by a face cam 306, secured to shaft 69 and having four lobes 307, 308, 309 and 310. The fingers 194 "beat up the weft," the weft being, of course, the pickets.

Referring to Figure 1: Cam shaft 69 is driven by a bevel gear 311, meshing with a bevel gear 312, secured to the upper end of vertical shaft 81, immediately below bearing 313.

Looping.

Between the last of spindles 166 and the first of spindles 168, and near the upper ends is a switch or deflector 182 (Fig. 10) secured to the upper end of a vertical shaft 183. Shaft 183 (Fig. 11) is journaled at its upper end in a bracket 184, which is fastened to angle bar 16, and extends through bearings 159, and has secured to its lower end a lever 185 (Fig. 32).

Mounted in one of the grooves 181 (Fig. 16) in beams 181 and 208, depending upon the height of fence desired, is a picket bending mechanism which is constructed as follows: A hollow shaft 209 is journaled in bearings 210 and 211 carried on beams 181 and 208 respectively, in such a manner that it can rotate and also be moved endwise a limited amount. On the end of hollow shaft 209 next the fence is a lever 212, in the end of which is fastened a finger 213, which is adapted to engage the wire and form the loops in the long pickets. Secured to the other end of hollow shaft 209 is a key 214 which is slidably splined in a helical gear 215. Gear 215 is prevented from endwise movement by having engaged in its annular groove 216 a retainer plate 217 which is bolted to beam 208.

Within hollow shaft 209 is a stationary shaft 218 which has secured to it at one end and adapted to register with the fence, a bending head, 219. The opposite end of shaft 218 is connected by links 220 to a lever 221 which is adjustably connected to a hub 222; hub 222 being secured to a rocker shaft 223 which is journaled in brackets 224 and 225 suspended from beams 181 and 208. The links 220 prevent shaft 218 and head 219 from turning and as hollow shaft 209 is mounted between head 219 and the enlarged end 226 of shaft 218, it will slide back and forth with shaft 218 whenever it is moved by lever 221.

Bending head 219 (Fig. 15) has on its face four lugs 227, 228, 229 and 230 which project through the fence, when head 219 is moved in towards it. It is around lugs 228 and 229 that the loop of the long picket is formed, the other lugs acting as supports.

Helical gear 215 (Fig. 16) is driven by helical gear 231 splined to shaft 232 (Fig. 15). Shaft 232 is carried in housing 11 at one end, and a bearing 233 at the other end, which bearing is fastened to beam 208. Shaft 232 is driven through bevel gears 234 and 235, shaft 236 and bevel pinion 237 intermittently from a mutilated bevel gear 238, which is secured to shaft 69.

Gear 238 has left in it at one point, three teeth 239 (Fig. 30), three others diametrically opposed 240, and at halfway points between these, seven teeth 241 and seven other teeth 242. Secured to pinion 237 is a modified form of a Geneva plate 243, having flat faces 244 and 245 (Fig. 34), which engage the broken contact face 246, on gear 238, for the purpose of preventing pinion 237 and the train of gears leading to finger 213 from revolving while bending head 219 is being moved in or out of engagement with the fence.

A bending mechanism for forming the loops in the short pickets, similar to the one described, is carried in bearings 247 and 248 and consists of a hollow shaft 249 (Fig. 32), on one end of which is secured a lever 250 in the end of which is fastened a finger 251 which is adapted to engage the wire and form the loops in the short pickets. Secured to the other end of hollow shaft 249 is a key 252 which is slidably splined in a helical gear 253. Gear 253 is prevented from endwise movement by also having engaged in its annular groove 254 the retainer plate 217. Within hollow shaft 249 is a stationary shaft 255, which has secured to it at one end, and adapted to register with the fence a bending head 256. The opposite end of shaft 255 is connected by links 257 to a lever 258 which is adjustably connected to a hub 259, secured to a rocker-shaft 260, which is journaled in brackets 225 and 261.

Bending head 256 has on its face four lugs 262, 263, 264 and 265 (Fig. 15), which project through the fence when head 256 is moved in towards it, and it is around lugs 263 and 264 that the loop of the short picket is formed.

Gear 253 is driven by a gear 266 (Fig. 15) splined to shaft 267. Shaft 267 is carried in housing 10 at one end, and in bearing 233 at the other end, and is driven through bevel gears 268 and 269, shaft 270, and bevel pinion 271 intermittently from the mutilated bevel gear 272 secured to shaft 69.

Gear 272 has left in it at one point three teeth 273 (Fig. 29) and following these approximately a quarter turn, seven teeth 274. Secured to pinion 271 is a Geneva plate 275, similar to plate 243, having its faces engaging the broken contact face 276, on gear 272, for the purpose of preventing pinion 271 and the train of gears leading to finger 251 from revolving while bending head 256 is being moved in or out of engagement with the fence.

Referring to Figures 15 and 31: Secured to rocker shaft 223 is a lever 277 carrying a roller 278, which is actuated by a face cam 279, secured to shaft 69 and having lobes 280 and 281 diametrically opposed.

Referring to Figures 15 and 22: Secured to rocker shaft 260 is a lever 282, carrying a roller 283 which is actuated by a face cam 284, secured to shaft 69, and having one lobe 285. Cam 284 has on its periphery, a lug 286, for actuating, by means of a roller 287, a lever 288, pivoted at 289 and having connected to its extension 290, a link 291, the other end of which is pinned to the switch lever 185.

*Operation—Especially looping.*

It will be noted that the position of the parts as shown in Figures 1 and 3 and the position of the parts shown in Figures 12 and 13 differ from that shown in the rest of the views. This is to show more clearly the parts. The balance of the drawings show the various parts and units of the machine in relative positions. In the operation of the machine it is best to describe the weaving of the fence by tracing down the sequence of pickets as shown in Figure 11, as follows:

With guide boxes 174 in position, fingers 194 down (as shown in Fig. 16 in dotted lines) bending head 256 back out of engagement and bending head 219 engaged with the fence and the switch 182 in the position shown in Fig. 10, the clutch 27 (Fig. 3) is engaged feeding in picket A. When the proper length of picket is reached clutch 27 is disengaged and picket is cut off by knife 199 (Fig. 33). The fingers 194 then raise the picket into the twist as shown by dotted lines in Figure 11 and while fence is pulled up distance A—B, the twisting spindles 166 and 168 rotate counter-clockwise seen from above 1½ turns; and the fingers 194 drop down to position shown by dotted lines in Figure 16 leaving the picket caught in the twist.

With switch 182 turned as indicated by dotted lines in Figure 10 and held long enough to deflect picket B behind twisting spindles 166, picket B is fed in; cut off; and raised by the fingers 194 and while fence is pulled up distance B—C; the twisting spindles 166 and 168 rotate counter-clockwise again 1½ turns; and the fingers 194 drop down again.

Picket C is fed in and cut off. The fingers 194 raise picket C into place and the fence is again pulled up distance C—D, but with the twisting spindles 166 and 168 rotating in a clockwise direction, one and one-half turns; and the fingers 194 then dropping down. With the guide boxes 174 dropped down, bending head 256 is moved into engagement with the fence; end D of picket B is turned under by forming-finger 251 and fingers 194 raise end D up into the twist, bending head 256 moves back out of engagement with the fence, forming-finger 251 rotates to its original position and the fence is pulled up distance D—A' while twisting spindles 166 and 168 rotate again clock-wise one and one half turns, the fingers 194 drop down and the guide boxes 174 return to their former position.

Bending head 219 is moved into engagement with the fence; end F of picket A is turned under by bending finger 213 and a picket A' of a second series is fed in, cut off and raised by fingers 194; end F is pushed up and held by picket A' within slot 188 until both are caught and raised by fingers 194 into the twist, while bending-finger 213 rotates to its original position.

In a similar manner end E of picket C is turned under and a subsequent picket C' of the following series is fed in and holds end E until caught in the twist.

Referring to Figures 12, 13 and 14: In order that the ends E, F, E', F', etc. may be separated from each other, so the proper one will be bent down by finger 213, there is provided a deflecting bar 314, to one side of which the pickets are first fed, as may be seen at A''. As the fence is pulled up, the end of the picket is bent or sprung away from finger 213, as may be seen by position of the end E' of picket C'. While end E' is being thus held, end F' is raised beyond the upper end of deflecting bar 314, and is sprung back by cam 315 formed in the edge of bracket 316. To assist in springing back the end F,' bending head 219, in engaging the fence, forces it slightly beyond its normal position in the machine, causing end F' to rock on cam 315. This may be clearly seen in Figure 14.

The ends of the pickets are guided into the bifurcations 172 in spindles 166 by means of guides 317, 318, 319 and 320.

In order that finger 213 will clear the ends of the pickets when bending-head 219 is moved towards fence, the ends are held down as shown by dotted lines at F' (Fig. 12) by lug 331 on bracket 316, the ends coming in contact with lug 331 before the fence has completed its motion, while being pulled up into position for the bending operation.

Referring to Figures 11 and 35: The end D' of picket B' after having been deflected by switch 182 and carried up with the fence comes in contact with the horizontal portion 321 of bracket 193' which holds it in the position shown by dotted lines permitting finger 321 to pass over it while bending-head 256 is moved towards fence, after which the picket is bent down by a finger 251. In its course downward picket end D' is guided into bifurcations 173 in spindles 168 by long curved guide bar 322 (see middle left-hand portion of Fig. 11) and guide plate 323, and from one to another of spindles 168 by guides 324, 325 and 326, which guides present a sort of stair-step appearance (as seen in the right-hand portion of Fig. 11).

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. In a loom for weaving wire fabrics, a warp shedding mechanism and weft supply mechanism, a plurality of benders spaced across the shed at varying distances from the weft supply to permit the rise of separate weft strands of excess length over the said varying distances, and said benders being capable of diverting the said excess lengths out of that portion of the shed on the far side of the bender from the weft supply, and being capable of reinserting the excess lengths into that portion of the shed between the bender and the weft supply and deflectors to keep the excess length of a weft out of the way while a succeeding weft is being inserted, subsantially as set forth.

2. In a loom for weaving wire fences, warp shedding mechanism, bending means, means to push a separate weft strand having surplus length through a shed to the bending means, said bending means being capable of later reinserting part of the surplus length into some succeeding shed, whereupon said pushing means then pushes a second separate weft strand through a fraction of a following shed to a second bending means, said second weft having a surplus over the fraction of the shed and said second bending means being capable of reinserting the last-named surplus into the same fractional proportion of some succeeding shed, substantially as set forth.

3. In a wire loom, a shedding mechanism and weft insertion mechanism, a bending head to permit the insertion of a weft strand of excess length into a shed and turn said excess length back again into a later shed, a rigid support adjacent the shed, and concentric sleeves extending through the support to hold the bending head, substantially as set forth.

4. A structure as specified in claim 3, in which a series of openings are spaced apart in said rigid support to permit the location of the bending head at varying distances along the shed, substantially as set forth.

5. In a wire loom, a shedding mechanism for each warp strand, and weft pushing mechanism, guiding funnels between some of the warp strands, each of said funnels having a hinged side to release the weft after the shed is closed, substantially as set forth.

6. In a loom using pushed in weft strands of greater length than the length of the weft being used, the combination of deflectors to keep the excess length out of the way while a succeeding weft is being inserted, and bending mechanism to reinsert the excess length into some succeeding shed, substantially as set forth.

7. In a loom for handling separate length weft strands that form more than one weft, the combination of a forming head normally retracted from the plane of the fabric being woven, a shaft to move the forming head into the plane of the fabric, a finger located adjacent said head, and a sleeve concentric with said shaft to move said finger about said head to curve the separate length weft strand about the forming head, substantially as set forth.

8. In a wire loom having shedding mechanism, the combination of means to insert part of a strand into a shed to form weft, deflecting means to hold the remaining portion of said strand out of the plane of the shed while a second strand is inserted into a second shed, and bending means to insert said remaining portion into a third shed, said deflecting means being interconnected with said bending means, substantially as set forth.

9. In a loom for wire fabrics having full length and fractional length wefts, rack operated means to twist the warp strands, the combination of a cam plate, two rollers mounted on the plate, two driven shafts adjacent the cam plate, two arms mounted on each shaft, and gearing connecting the two driven shafts with the rack, substantially as set forth.

10. A structure as specified in claim 9, in which there is an angular adjustment between the two driven shafts, and a second angular adjustment between the driven shafts and the rack, substantially as set forth.

11. In a loom, a set of rack and pinion operated warp strand twisters, a ratchet and pawl operated take-up, and gearing to cause the to-and-fro motion of said pinion to oscillate said pawls, substantially as set forth.

12. In a wire loom, two toothed wheels to feed in and crimp the weft, spur gears to synchronize the toothed wheels, and adjusting means to regulate the depth of intermesh of said toothed wheels without changing the spacing of the spur gears from each other in a radial direction, substantially as set forth.

13. In a wire loom, warp strand shedding means and means for pushing in weft, tapered guide boxes to guide the end of the weft from one warp strand to the next, means to reinsert a part of the weft strand into a different shed, and means to withdraw the guide boxes during said reinsertion, substantially as set forth.

14. In a wire loom, a shedding mechanism, weft insertion mechanism and weft arching means, a timing shaft to actuate the shedding mechanism to control the length of weft insertion, to position the arching means, and to actuate the arching means, substantially as set forth.

15. In a wire fabricating machine, the combination of a bending means to operate on wires after they are partially fabricated, a rigid support near the bending means, a shaft projecting through the rigid support to the bending means, and mechanism to impart oscillatory and reciprocative motions to the shaft, substantially as set forth.

16. In a machine to fabricate wire fences having arch formed pickets, the combination of a forming head, a rigid support near the forming head, concentric shafts projecting through the rigid support to the forming head, and mechanism remote from the forming head to impart rotary and reciprocatory motions to the shafts, substantially as set forth.

17. In a wire fabricating machine the combination of a forming head and bending finger to operate on a free portion of a wire after a part of the wire has been embedded in the fabric, a rigid support near the bending finger, a hollow shaft extending through the support to the bending finger, a second shaft extending through the hollow shaft to the forming head, and mechanism to reciprocate the two shafts in unison and to oscillate the hollow shaft, substantially as set forth.

18. A fabricating machine as specified in claim 17, in which a cam reciprocates the two shafts, and a mutilated gear oscillates the hollow shaft, substantially as set forth.

In witness whereof, I have hereunto set my hand at Indianapolis, Marion County, Indiana, this 18th day of August, A. D. nineteen hundred and twenty-six.

JOHN W. DWIGGINS.